Sept. 23, 1930.  E. FARRELL  1,776,382
CLOTH EXPANDER, CLOTH GUIDER, AND THE LIKE
Filed Oct. 29, 1929
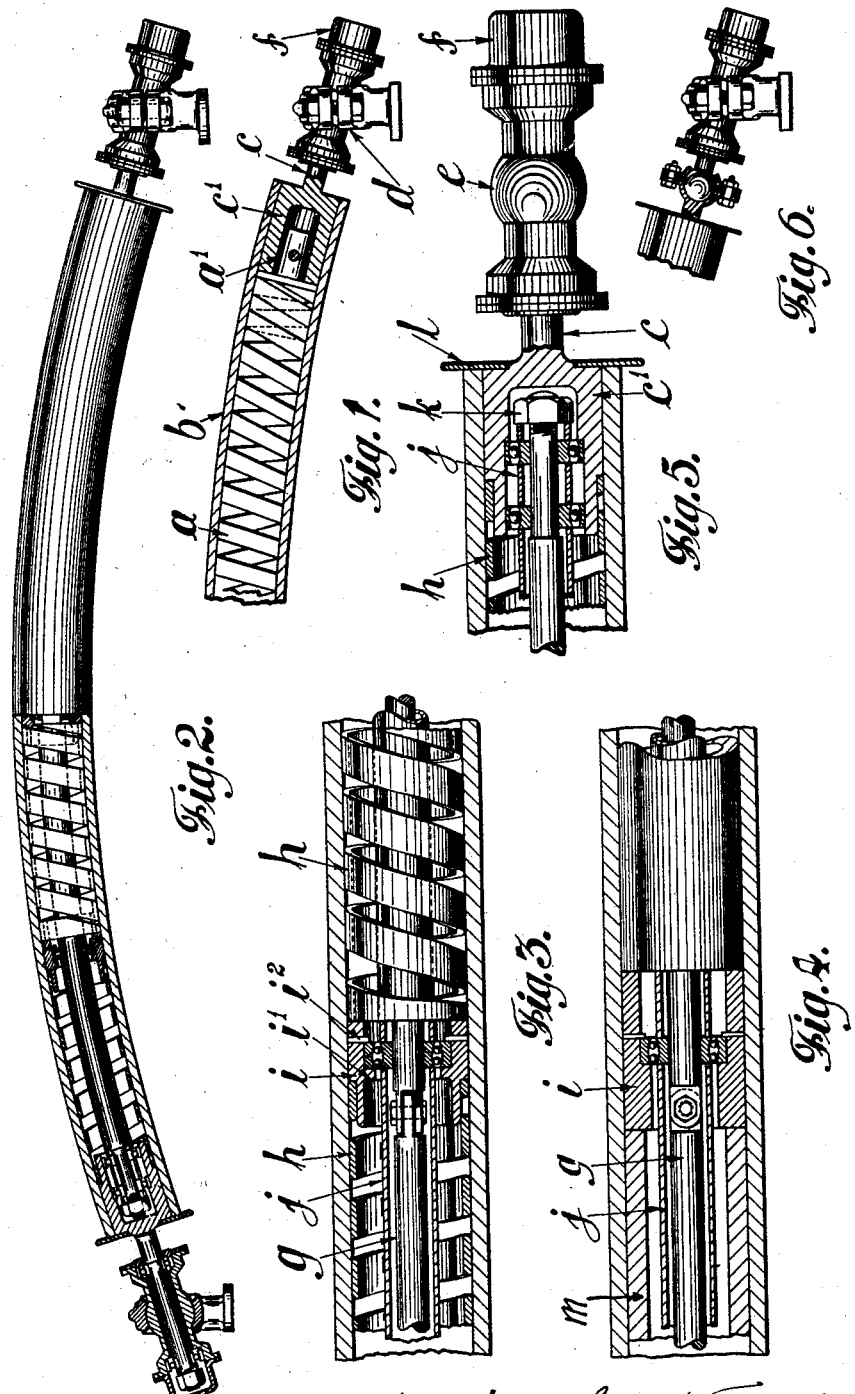
Inventor:- Ernest Farrell
By his Attorney:- Walter Gunro Patented Sept. 23, 1930

1,776,382

UNITED STATES PATENT OFFICE

ERNEST FARRELL, OF SALFORD, ENGLAND

CLOTH EXPANDER, CLOTH GUIDER, AND THE LIKE

Application filed October 29, 1929, Serial No. 403,241, and in Great Britain August 30, 1929.

This invention relates to cloth expanders, cloth guiders and the like as used in feeding fabrics to and from textile machinery, such as dye jigs, calenders, stentering machines, etc., and relates in particular to what have been heretofore known as curved bar expanders.

As hitherto made, such expanders have comprised a rigid, non-rotatable curved bar or rod passing continuously through the length of the expander, and a rotatable rubber sleeve or tube mounted on such curved bar or rod so as to be capable of rotating as the cloth is pulled over it, the bar projecting at each end beyond the rubber sleeve to form stationary trunnions, to be clamped against rotation in suitable brackets.

The two main drawbacks to expanders so made are:—(a) That the central rod and trunnions being stationary, the number of anti-friction bearings required between the rod and sleeve to be sufficient for amply supporting and allowing easy rotation of the sleeve, has added greatly to the initial cost of the expander, and moreover, such bearings, having been accessible by the corrosive liquors with which the cloth is treated, have added considerably to the maintenance cost of the expander; and, (b) that the curvature of the expander has been fixed and unalterable owing to the rigidity of the central bar.

This invention has for its object expanders which remove the above-mentioned and other drawbacks, by reducing the number of bearings required for the rubber sleeve, or by eliminating them altogther, by protecting the bearings, when used, from the corrosive action of the liquors, and/or by providing means to vary the curvature of the expander.

According to the invention the improved expander comprises a core, a rubber sleeve around the core, and trunnions connected to and extending beyond the ends of the sleeve, the sleeve and trunnions being adapted to rotate together, and bearings to receive the trunnions. The core may be flexible, and may consist of an inner non-rotating part and an outer rotating part. Further the bearings for receiving the trunnions may be adjustable to hold the trunnions in alternative angular positions, to vary the curvature of the bar, whilst at the same time permitting of their rotation.

Upon the accompanying drawing:—

Fig. 1 is a sectional longitudinal elevation of one half of the improved expander, according to one form of the invention.

Fig. 2 is a like view to Fig. 1, but illustrating a modified form of the improved expander.

Figs. 3, 4 and 5, are part sectional views, to a larger scale, of further modified forms of the invention, and Fig. 6 is a part sectional view of a still further modification.

In the example of the invention illustrated in Fig. 1, the improved expander comprises the flexible core $a$, in the form of a spiral spring of flat section, the rubber sleeve $b$ around the core, and trunnions $c$ connected by the enlarged part $c^1$ to the sleeve, and bearings $d$ to receive and hold the trunnions whilst allowing of their rotation. The spring core $a$ is connected to the enlarged part $c^1$ of the end trunnions $c$ by intermediate plugs $a^1$, the parts being sweated together and if desired pinned also as shown in Fig. 1. In this example, no bearings are required within the expander, the core sleeve and trunnions rotating as a whole, and as a result the resistance to rotation is much less than in known curved expanders.

The curvature or arc of the expander is variable the core $a$ being flexible, and to hold the expander in any set position the bearings $d$ are made adjustable. Each bearing comprises the stationary part $d$ with clamping cap, and a movable hub part $e$, the latter having a bulbous centre to oscillate in a spherical socket of the part $d$, the movable part also carrying anti-friction bearings to receive the end of the trunnions and form the bearings proper for the expander. By moving the bearings $d$ towards or away from each other, the bow of the expander is increased or decreased, and a predetermined curvature having been obtained, the caps of the bearings $d$ are clamped down to hold the parts $e$ in the set position without affecting the rotation of the trunnions therein. The ends of the hub parts *e* are flanged, and caps *f* are provided to protect the anti-friction bearings, one cap of each hub part being bored centrally to embrace the trunnion *c*. Thrust bearings may be furnished to take up the end thrust of the bowed expander.

Referring now to Fig. 2, the core of the expander is in two main parts, an inner non-rotatable member comprising the curved rod *g*, and an outer rotatable flexible supporting member comprising the coil spring *h*, the spring in this instance being in sections longitudinally. Between the sections and connecting them together are annular bearing rings *i*, each ring carrying the outer race of an anti-friction bearing, the inner race being carried by the inner non-rotatable part of the core. The rings *i* are of a diameter equal to the internal diameter of the rubber sleeve and have a flange at each side of smaller diameter to receive the spring sections, the spring also being of a diameter equal to the internal diameter of the rubber sleeve. The anti-friction bearings are held against endwise movement in the rings by internal flanges $i^1$ in the latter and pins $i^2$.

The trunnions in this construction form the end bearing rings, the anti-friction bearings being housed in the cup-shaped enlarged part of the trunnion. Between all the bearings on the rod *g* are spacing members *j*, and on the ends of the rod are nuts *k* serving to clamp the spacing members and bearing rings together. Over the ends of the expander are secured plates or flanges *l* to prevent the corrosive liquors creeping through to the interior of the expander and damaging the bearings.

With this construction of expander, the number of bearings for the rubber sleeve is small, owing to the flexible supporting members, and to the fact that the trunnions of the expander are free to rotate.

As a further modification the inner member *g* may be an articulated rod as shown in Fig. 3, in lieu of a one piece rod. Further, if desired, hollow rubber tubes *m* may take the place of the spring sections *h*, as illustrated in Fig. 4.

Again, the trunnions *c* may be in two parts, connected by a universal joint, see Fig. 6.

The inner member *g* of the core in the last described examples is a completely enclosed floating element, positioned against rotation by the angularity of its ends and by the end bearings, the outer sleeve with the end trunnions being free to rotate in the supporting bearings.

The rubber sleeve may be either parallel-sided, as shown, or may be of double cone formation, i. e., tapering outwards from the centre to the ends, the amount of taper being only slight. The resultant smaller diameter at the centre tends to prevent bowing of the cloth at the centre.

What I claim is:—

1. A curved cloth expander comprising a core, a rubber sleeve around said core, end trunnions connected to and extending beyond the ends of the sleeve, the sleeve and trunnions being adapted to rotate together, and bearings to receive the trunnions, as set forth.

2. A curved cloth expander comprising a flexible core, a rubber sleeve around said flexible core, end trunnions connected to and extending beyond the ends of the sleeve, the sleeve and trunnions being adapted to rotate together, and bearings to receive the trunnions, as set forth.

3. A curved cloth expander comprising a flexible core, a rubber sleeve around said flexible core, end trunnions integral with the flexible core and extending beyond the ends of the sleeve, the sleeve, trunnions and core being adapted to rotate together, and bearings to receive the trunnions, as set forth.

4. A curved cloth expander comprising a flexible core in the form of a coil spring, a rubber sleeve around said flexible core, end trunnions integral with the flexible core and extending beyond the ends of the sleeve, the sleeve, trunnions and core being adapted to rotate together, and bearings to receive the trunnions, as set forth.

5. A curved cloth expander comprising a core, a rubber sleeve around said core, end trunnions connected to and extending beyond the ends of the sleeve, the sleeve and trunnions being adapted to rotate together, and bearings to receive the trunnions and hold them, whilst permitting of rotation, in alternative angular positions to vary the curvature of the expander, as set forth.

6. A curved cloth expander comprising a flexible core consisting of a hollow resilient rotatable outer member and an inner non-resilient and non-rotatable supporting member, and spaced bearings between the rotatable and non-rotatable core members; a rubber sleeve around said core; end trunnions connected to the sleeve, and to the rotatable core member, the trunnions, sleeve and core member rotating together as a unit; and bearings to receive the trunnions, the non-rotatable core member providing the required shape of the expander, as set forth.

7. A curved cloth expander comprising a flexible core consisting of a hollow resilient rotatable outer member and an inner non-resilient and non-rotatable articulated supporting member, and spaced bearings between the rotatable and non-rotatable core members; a rubber sleeve around said core; end trunnions connected to the sleeve, and to the rotatable core member, the trunnions, sleeve and core member rotating together as a unit; and adjustable bearings to receive the trunnions; the non-rotatable bearings, in conjunction with the articulated core member, providing the required shape of the expander, as set forth.

8. A curved cloth expander comprising a flexible core, consisting of a sectional hollow resilient rotatable outer member, an inner non-resilient and non-rotatable articulated member, anti-friction bearings on the inner member connecting and supporting the sections of the outer member, spacing members between the bearings, and clamping means on the ends of the inner member to secure the anti-friction bearings and spacing members thereon; a rubber sleeve surrounding the said core; end trunnions connected to the sleeve and rotatable core member, the trunnions, sleeve and core member rotating together as a unit; and adjustable bearings to receive the trunnions, as set forth.

9. A curved cloth expander as claimed in claim 6, in which the anti-friction bearings comprise an annular ring equal in diameter to the internal diameter of the rubber sleeve with flange at each side of less diameter, inner and outer race rings and balls within the annular ring, and means to position the race rings endwise of the annular ring, as set forth.

10. A curved cloth expander as claimed in claim 6, in which the end trunnions have a cup-shaped part to fit within the end of the rubber sleeve, anti-friction bearings in the cup-shaped part for the end of the core, and an end plate covering the joint between the sleeve and trunnion, as set forth.

In testimony whereof I have signed my name to this specification.

ERNEST FARRELL.